(12) United States Patent
Hayashi et al.

(10) Patent No.: US 8,108,478 B2
(45) Date of Patent: Jan. 31, 2012

(54) ELECTRONIC MAIL SENDING SYSTEM, ELECTRONIC MAIL SENDING METHOD, AND COMPUTER READABLE MEDIUM

(75) Inventors: Naoki Hayashi, Ashigarakami-gun (JP); Toshiroh Shimada, Ashigarakami-gun (JP); Hitoshi Ikeda, Ashigarakami-gun (JP); Tomoyuki Shoya, Ashigarakami-gun (JP); Yasunori Saito, Minato-ku (JP); Hajime Ueno, Ashigarakami-gun (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 12/615,849

(22) Filed: Nov. 10, 2009

(65) Prior Publication Data

US 2010/0332606 A1 Dec. 30, 2010

(30) Foreign Application Priority Data

Jun. 26, 2009 (JP) ................................. 2009-152584

(51) Int. Cl.
*G06F 15/16* (2006.01)
*G06F 15/173* (2006.01)
(52) U.S. Cl. ...................... 709/206; 709/225; 709/245
(58) Field of Classification Search .................. 709/206, 709/225, 245
See application file for complete search history.

(56) References Cited

U.S. PATENT DOCUMENTS

| 7,389,322 | B1 | 6/2008 | Miyazawa | |
|---|---|---|---|---|
| 2005/0091323 | A1* | 4/2005 | Smith et al. | 709/206 |
| 2007/0005708 | A1* | 1/2007 | Juliano | 709/206 |
| 2007/0192421 | A1* | 8/2007 | Iwai | 709/206 |
| 2007/0282961 | A1 | 12/2007 | Miyazawa | |
| 2008/0235334 | A1* | 9/2008 | Gupta et al. | 709/206 |
| 2009/0172096 | A1* | 7/2009 | Muller et al. | 709/204 |
| 2009/0299725 | A1* | 12/2009 | Grigsby et al. | 704/2 |
| 2010/0002260 | A1* | 1/2010 | Naylor et al. | 358/1.15 |
| 2010/0138863 | A1* | 6/2010 | Diaz Perez | 725/42 |

FOREIGN PATENT DOCUMENTS

| JP | 2000-196583 A | 7/2000 |
|---|---|---|
| JP | 2001-125844 A | 5/2001 |

* cited by examiner

*Primary Examiner* — Patrice Winder
*Assistant Examiner* — Ebrahim Golabbakhsh
(74) *Attorney, Agent, or Firm* — Sughrue Mion, PLLC

(57) ABSTRACT

An electronic mail sending system that includes: a sending terminal that sends an electronic mail; a maintenance unit to maintain a mail address of a mailing list; a difference determination unit comprising: a determination unit that determines a difference between a first mail address provided from the maintenance unit on the basis of a mailing list and a second mail address of a same mailing list as the mailing list used at previous sending time when the electronic mail is sent from the sending terminal with the mailing list being specified as an address of the electronic mail; and a display controller that displays a determination result by the determination unit on the sending terminal; and a sending controller that controls sending of the electronic mail on the basis of an instruction given based on the determination result displayed on the sending terminal.

9 Claims, 18 Drawing Sheets

FIG. 11A

| IDENTIFICATION INFORMATION | MAILING LIST | MAIL ADDRESS IDENIFICATION INFORMATION 1 | MAIL ADDRESS IDENTIFICATION INFORMATION 2 | MAIL ADDRESS IDENTIFICATION INFORMATION 3 |
|---|---|---|---|---|
| L001 | mailinglist-a@xyz.jp | 001 | 002 | |
| L002 | mailinglist-g@xyz.jp | 013 | 015 | 019 |
| L003 | mailinglist-x@xyz.jp | 024 | 025 | |

FIG. 11B

| IDENTIFICATION INFORMATION | MAILING LIST | MAIL ADDRESS IDENIFICATION INFORMATION 1 | MAIL ADDRESS IDENTIFICATION INFORMATION 2 | MAIL ADDRESS IDENTIFICATION INFORMATION 3 |
|---|---|---|---|---|
| L001 | mailinglist-a@xyz.jp | 001 | 002 | 011 |
| L002 | mailinglist-g@xyz.jp | 013 | 015 | 019 |
| L003 | mailinglist-x@xyz.jp | 024 | 025 | |

FIG. 11C

| IDENTIFICATION INFORMATION | MAILING LIST | MAIL ADDRESS IDENIFICATION INFORMATION 1 | MAIL ADDRESS IDENTIFICATION INFORMATION 2 | MAIL ADDRESS IDENTIFICATION INFORMATION 3 |
|---|---|---|---|---|
| L001 | mailinglist-a@xyz.jp | 002 | 011 | |
| L002 | mailinglist-g@xyz.jp | 013 | 015 | 019 |
| L003 | mailinglist-x@xyz.jp | 024 | 025 | |

FIG. 12
| MAIL ADDRESS IDENTIFICATION INFORMATION | NAME | MAIL ADDRESS | FACE IMAGE |
|---|---|---|---|
| 001 | A. A | aaa@xyz.jp |  |
| 002 | B. B | bbb@xyz.jp |  |
| ⋮ | ⋮ | ⋮ | ⋮ |
| 011 | K. K | kkk@xyz.jp |  |
| ⋮ | ⋮ | ⋮ | ⋮ |
| 024 | X. X | xxx@xyz.jp |  |
| 025 | Y. Y | yyy@xyz.jp |  |
| ⋮ | ⋮ | ⋮ | ⋮ |

FIG. 24
| IDENTIFICATION INFORMATION | NAME | MAIL ADDRESS | FACE IMAGE (ADDED) | FACE IMAGE (REMOVED) |
|---|---|---|---|---|
| 001 | A. A | aaa@xyz.jp |  |  |
| 002 | B. B | bbb@xyz.jp |  |  |
| ⋮ | ⋮ | ⋮ | ⋮ | ⋮ |
| 011 | K. K | kkk@xyz.jp |  |  |
| ⋮ | ⋮ | ⋮ | ⋮ | ⋮ |
| 024 | X. X | xxx@xyz.jp |  |  |
| 025 | Y. Y | yyy@xyz.jp |  |  |
| ⋮ | ⋮ | ⋮ | ⋮ | ⋮ |

ELECTRONIC MAIL SENDING SYSTEM, ELECTRONIC MAIL SENDING METHOD, AND COMPUTER READABLE MEDIUM

CROSS-REFERENCE TO RELATED APPLICATION

This application is based on and claims priority under 35 USC 119 from Japanese Patent Application No. 2009-152584 filed Jun. 26, 2009.

BACKGROUND (i) Technical Field

This invention relates to an electronic mail sending system, an electronic mail sending method, and a computer readable medium.

(ii) Related Art

It has been known to send an electronic mail (E-mail) by specifying a mailing list as an address in the case of sending the E-mail with same contents to multiple addresses at one time. A mailing list can be maintained by an administrator who maintains the mailing list. The administrator, as necessary, removes a mail address of the mailing list, and adds new address to the mailing list.

There has also been known an art that prevents sending a reply mail to all mail addresses of the mailing list by mistake.

SUMMARY

According to an aspect of the present invention, there is provided an electronic mail sending system including: a sending terminal that sends an electronic mail; a maintenance unit to maintain a mail address of a mailing list; a difference determination unit comprising: a determination unit that determines a difference between a first mail address provided from the maintenance unit on the basis of a mailing list and a second mail address of a same mailing list as the mailing list used at previous sending time when the electronic mail is sent from the sending terminal with the mailing list being specified as an address of the electronic mail; and a display controller that displays a determination result by the determination unit on the sending terminal; and a sending controller that controls sending of the electronic mail on the basis of an instruction given based on the determination result displayed on the sending terminal.

BRIEF DESCRIPTION OF THE DRAWINGS

Exemplary embodiments of the present invention will be described in detail based on the following figures, wherein:

FIGS. 11A through 11C are examples of a mailing list table;

FIG. 12 is an example of a mail address table;

FIG. 24 is another example of a mail address table; and

DETAILED DESCRIPTION

A description will now be given, with reference to the accompanying drawings, of exemplary embodiments of the present invention.

First Exemplary Embodiment

Figure 1:
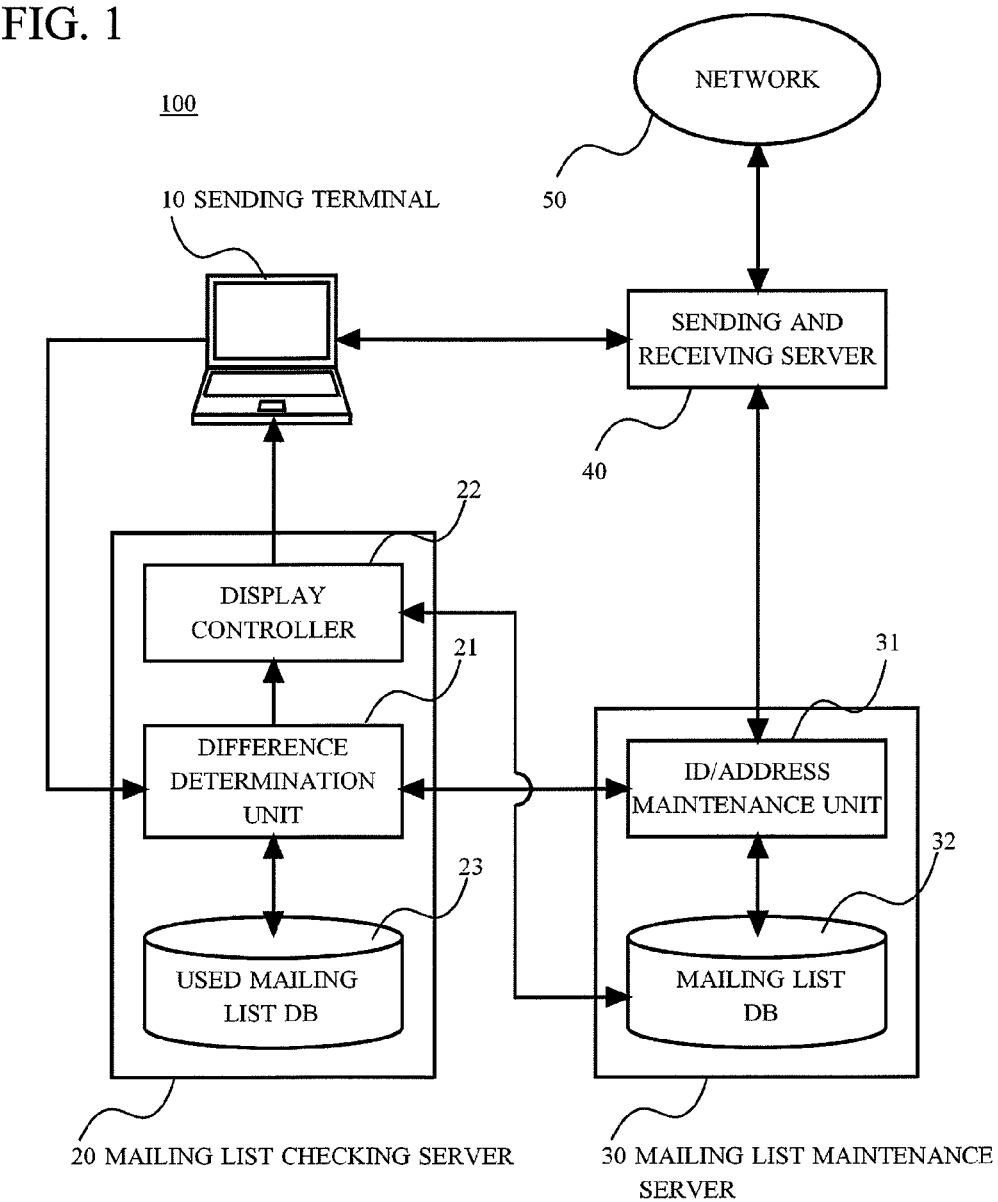
FIG. 1 is an example of a configuration diagram of an electronic mail sending system.

FIG. 1 is an example of a configuration diagram of an electronic mail sending system 100.

The electronic mail sending system 100 is composed of: a sending terminal 10; a mailing list check server 20 as a difference determination unit of the present invention; a mailing list maintenance server 30 as a maintenance unit of the present invention; and a sending and receiving server 40 as a sending controller of the present invention.

The sending terminal 10 is operated by a sender who sends E-mail. The sender creates a message and sends it to a receiver. The receiver is selected by being specified in the "To" box on the message creation screen. A mailing list can be specified in the "To" box as well as a mail address. The mailing list is composed of one or multiple mail addresses. When the mailing list is used, the created message is sent to all mail addresses of the mailing list. Briefly, a simultaneous transmissive communication is established. Therefore, when sending a same message to multiple receivers, it is not necessary to specify a mail address one by one.

The mailing list check server 20 is composed of: a difference determination unit 21 that determines the difference between a mail address provided from the mailing list maintenance server 30 on the basis of its mailing list (a first mail address), and a mail address of the mailing list used at previous sending time (a second mail address) when the E-mail is sent from the sending terminal 10 with the mailing list being specified as the address; and a display controller 22 that displays a determination result from the difference determination unit 21 on the sending terminal 10. The second mail address of the mailing list used at previous sending time is stored in a used mailing list DB 23. The difference determination unit 21, the display controller 22, and the used mailing list DB 23 will be described in detail later.

The mailing list maintenance server 30 is composed of: an ID/address maintenance unit 31; and a mailing list DB 32. The mailing list maintenance server 30 maintains the mail addresses of the mailing list. The ID/address maintenance unit 31 transmits mail address identification information to the mailing list check server 20 on the basis of an instruction from the mailing list check server 20. In addition, the ID/address maintenance unit 31 transmits a mail address to the sending and receiving server 40 on the basis of various instructions from the sending and receiving server 40. The mailing list DB 32 stores mail addresses of E-mail users and the mailing list composed of mail addresses. The mailing list maintenance server 30 is maintained by an administrator who maintains the electronic mail sending system 100.

The sending and receiving server 40 receives E-mail sent from the sending terminal 10, and sends it to the mail address specified in the "To" box. In addition, the sending and receiving server 40 sends E-mail received from a network 50, to the sending terminal 10. Furthermore, the sending and receiving server 40 controls a sending of E-mail on the basis of the instruction given based on the determination result displayed on the sending terminal 10. More specifically, when the instruction of permission is given based on the determination result, the sending and receiving server 40 executes sending. When the instruction of cancel is given based on the determination result, the sending and receiving server 40 cancels sending.

A hardware composition of the mailing list check server 20 will be described.

Figure 2:
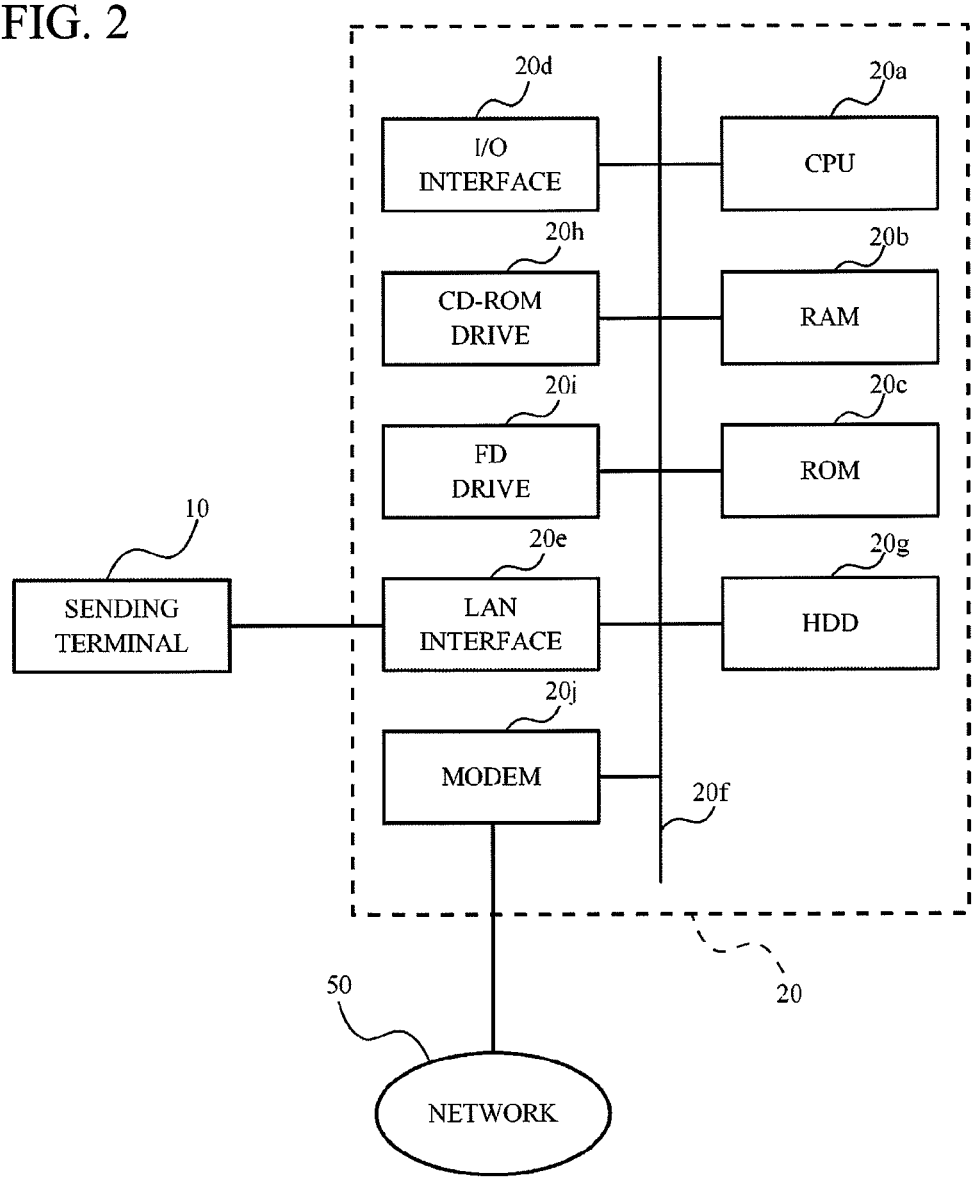
FIG. 2 is a block diagram illustrating a hardware composition of a mailing list check server.

FIG. 2 is a block diagram illustrating a hardware composition of the mailing list check server 20.

As illustrated in FIG. 2, the mailing list check server 20 is built with hardware components including: a CPU 20*a*; a RAM 20*b* such as a SRAM (Static Random Access Memory), a DRAM (Dynamic RAM), a SDRAM (Synchronous DRAM), and a NVRAM (Non Volatile RAM); a ROM (Read Only Memory) 20*c* such as a flash memory; and an I/O interface 20*d* and a LAN interface 20*e* that control the input and output, the hardware components are connected to each other with a bus 20*f*. Briefly, it is built with a computer.

Therefore, the CPU 20*a* reads required programs stored in the storage such as the RAM 20*b* and the ROM 20*c*, and executes the calculation according to the programs, so that each function of the mailing list check server 20 described above is implemented. The sending terminal 10, the mailing list maintenance server 30, and the sending and receiving server 40 have almost same components. These programs can be the programs according to the flowcharts described later. In addition, as illustrated in FIG. 2, a HDD (Hard Disk Drive) 20*g*, a CD-ROM drive 20*h*, a FD drive 20*i*, and a modem 20*j* may be connected to the bus 20*f* as necessary.

As just described, according to the electronic mail sending system described above, the sending terminal 10 sends E-mail to the sending and receiving server 40. The E-mail is stored in the sending and receiving server 40. The sending terminal 10 transmits the mailing list to the mailing list check server 20 when the mailing list is specified as an E-mail address. The mailing list check server 20 receives the mail address identification information of the mailing list from the mailing list maintenance server 30. In addition, the mailing list check server 20 acquires the mail address identification information of the mailing list from the used mailing list DB 23. The mail address identification information of the mailing list at the previous sending time is stored in the used mailing list DB 23.

The mailing list check server 20 determines a difference between the received mail address identification information and the acquired mail address identification information, and displays the determination result on the sending terminal 10. The sending terminal 10 displays the determination result, and transmits the instruction to the sending and receiving server 40 in the case that the instruction is given based on the determination result. The sending and receiving server 40 sends the E-mail stored in the sending and receiving server 40, or cancels sending, on the basis of the instruction.

Then, a behavior of the electronic mail sending system 100 will be described.

A behavior of the sending terminal 10 will be described with reference to FIG. 3 and FIG. 4.

Figure 3:
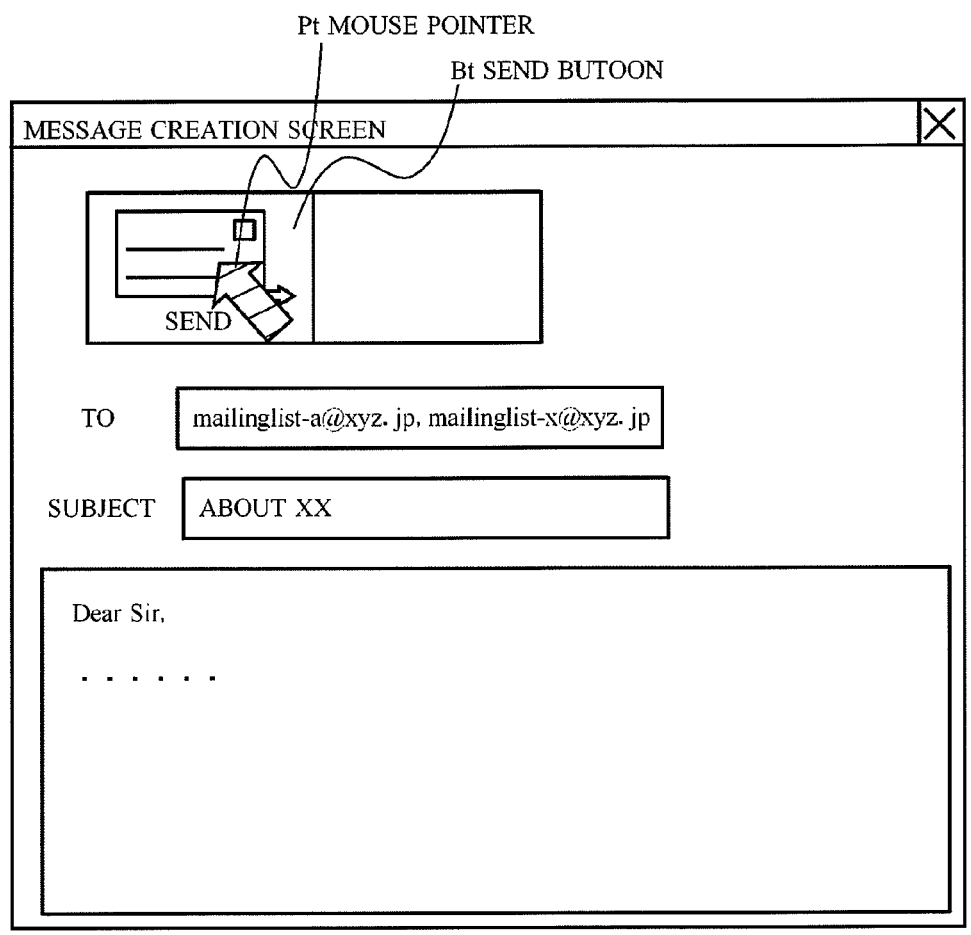
FIG. 3 is an example of a message creation screen displayed on a sending terminal.
Figure 4:
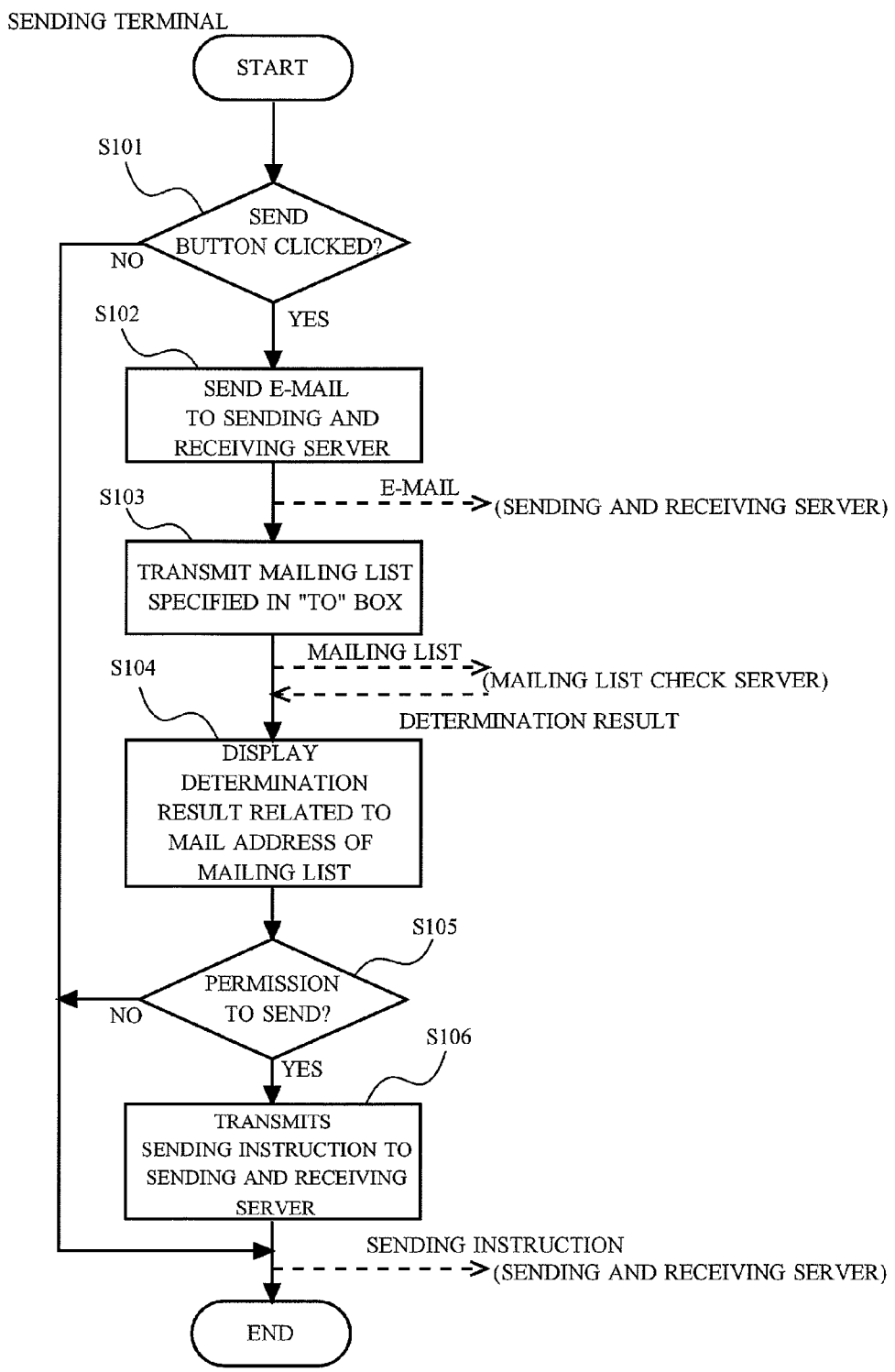
FIG. 4 is a flowchart illustrating a behavior of a sending terminal.

FIG. 3 is an example of a message creation screen displayed on the sending terminal 10, and FIG. 4 is a flowchart illustrating a behavior of the sending terminal 10.

As illustrated in FIG. 3, a sender of E-mail creates a message on a message creation screen. The sender specifies the address that is the destination of this message. In FIG. 3, the mailing lists "mailinglist-a@xyz.jp" and "mailinglist-x@xyz.jp" are specified. Accordingly, E-mail will be sent to all mail addresses of the mailing lists "mailinglist-a@xyz.jp" and "mailinglist-x@xyz.jp". When the sender sends a message, the sender positions the mouse pointer Pt to the send button Bt, and clicks the send button Bt. Thus, a sending instruction of E-mail to the sending terminal 10 (a first sending instruction) is output.

As illustrated in FIG. 4, when it is determined that the send button Bt is clicked (step S101: YES), the sending terminal 10 sends E-mail with the created message to the sending and receiving server 40 (step S102). Therefore, the E-mail is stored in the sending and receiving server 40. Then, the sending terminal 10 transmits the mailing lists specified in the "To" box to the mailing list check server 20 (step S103). More specifically, the sending terminal 10 transmits them to the difference determination unit 21.

Then, when the sending terminal 10 receives the determination result based on the mailing lists, which is sent to the mailing list check server 20, from the mailing list check server 20, the sending terminal 10 displays the determination result about the difference in the mail address of the mailing list (step S104). The determination result is displayed on a check screen described later. This determination result will change according to the existence of the difference and reason of the difference. This difference occurs when the administrator who maintains the mailing list maintenance server 30 removes a mail address of the mailing list or adds new mail address to the mailing list.

Here, display examples of the sending terminal 10 depending on the existence of the difference and reason of the difference, will be described with reference to FIG. 5 to FIG. 10.

Figure 5:
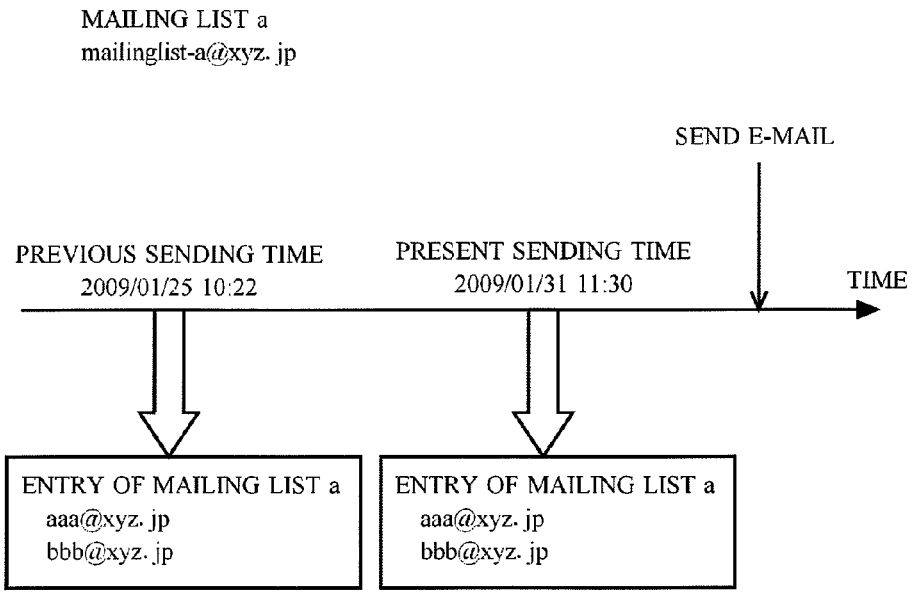
FIG. 5 is a diagram to explain the case that a difference does not exist.
Figure 6:
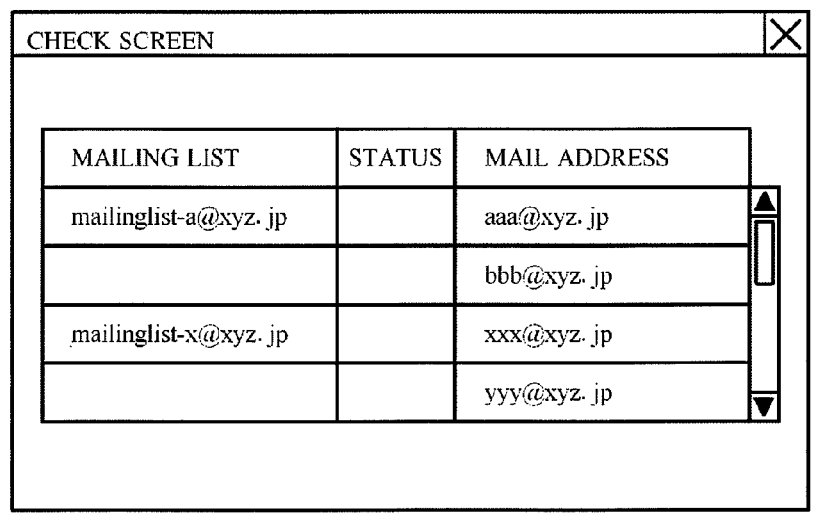
FIG. 6 is an example of a check screen displayed on a sending terminal.

FIG. 5 is a diagram to explain the case that the difference does not exist, and FIG. 6 is an example of the check screen displayed on the sending terminal 10. As illustrated in FIG. 5, for example, E-mail was sent to the mailing list "mailinglist-a@xyz.jp" at the previous sending time "2009/01/25 10:22" and E-mail is sent to the mailing list "mailinglist-a@xyz.jp" at the present sending time "2009/01/31 11:30" again. In this case, the difference does not exist in the mail addresses "aaa@xyz.jp" and "bbb@xyz.jp" of the mailing list "mailinglist-a@xyz.jp", at both times.

Therefore, when the difference does not exist in the "mailinglist-x@xyz.jp", the sending terminal 10 displays each mailing list "mailinglist-a@xyz.jp" and "mailinglist-x@xyz.jp" as illustrated in FIG. 6. In addition, the sending terminal 10 displays the mail addresses "aaa@xyz.jp" and "bbb@xyz.jp" of the mailing list "mailinglist-a@xyz.jp", and the mail addresses "xxx@xyz.jp" and "yyy@xyz.jp" of the mailing list "mailinglist-x@xyz.jp". When the difference does not exist, a "STATUS" filed on the check screen illustrated in FIG. 6 will be blank.

Figure 7:
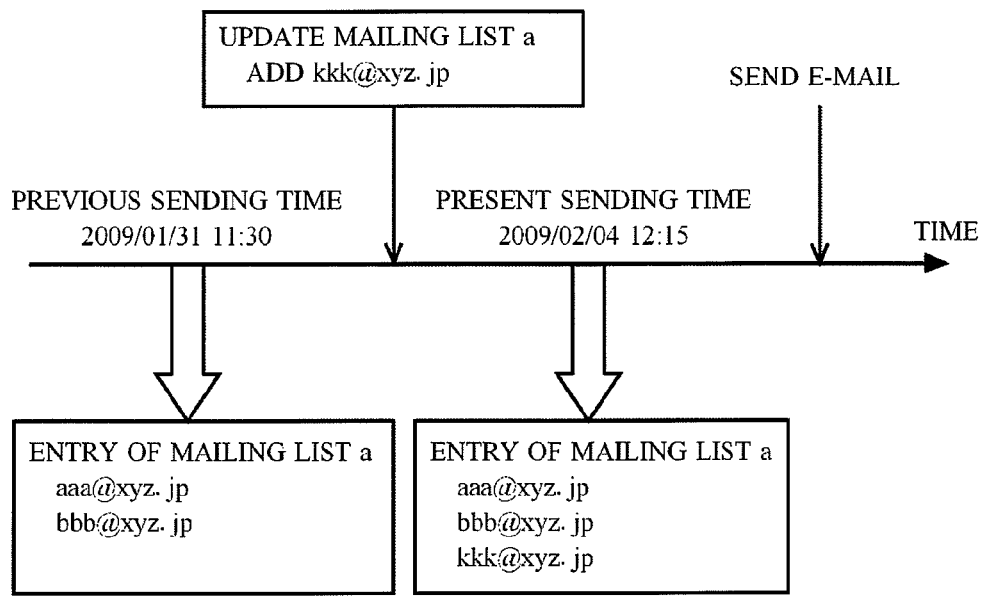
FIG. 7 is a diagram to explain the case that the difference exists.
Figure 8:
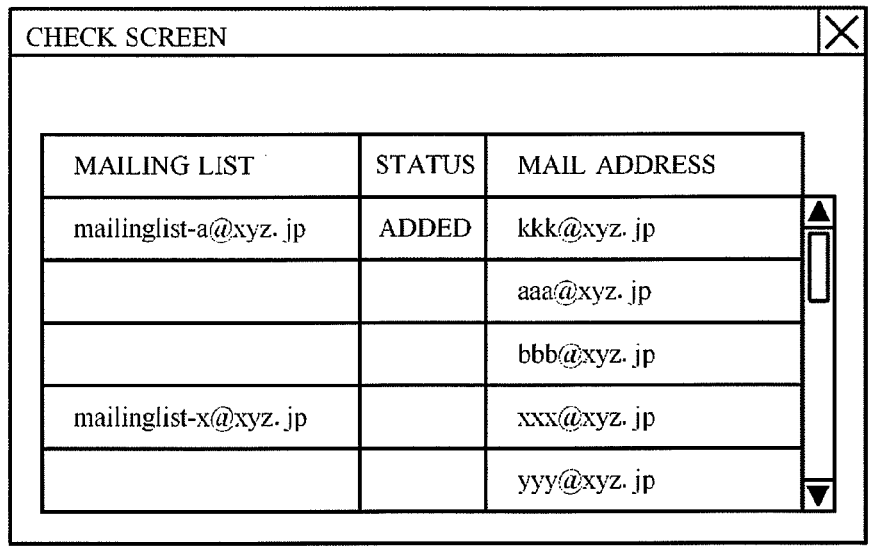
FIG. 8 is an example of a check screen displayed on the sending terminal.

FIG. 7 is a diagram to explain the case that the difference exists, and FIG. 8 is an example of the check screen displayed on the sending terminal 10. For example, E-mail was sent to the mailing list "mailinglist-a@xyz.jp" at the previous sending time "2009/01/31 11:30", and the mail address "kkk@xyz.jp" is added to the mailing list "mailinglist-a@xyz.jp" by the administrator before E-mail is sent to the mailing list "mailinglist-a@xyz.jp" at the present sending time "2009/02/04 12:15" again. In this case, the difference exists in the mail addresses of the mailing list "mailinglist-a@xyz.jp" between the present sending time and the previous sending time. The difference does not exist in the mailing list "mailinglist-x@xyz.jp".

Therefore, as illustrated in FIG. 8, the sending terminal 10 displays each mailing list "mailinglist-a@xyz.jp" and "mailinglist-x@xyz.jp". In addition, the sending terminal 10 displays: the mail addresses "kkk@xyz.jp", "aaa@xyz.jp", and "bbb@xyz.jp" of the mailing list "mailinglist-a@xyz.jp"; and the mail addresses "xxx@xyz.jp" and "yyy@xyz.jp" of the mailing list "mailinglist-a@xyz.jp". Because the difference exists, the sending terminal 10 displays "ADDED" as the reason of the difference in the "STATUS" field of the mail address "kkk@xyz.jp" corresponding to the difference (a third mail address) on the check screen illustrated in FIG. 8.

Figure 9:
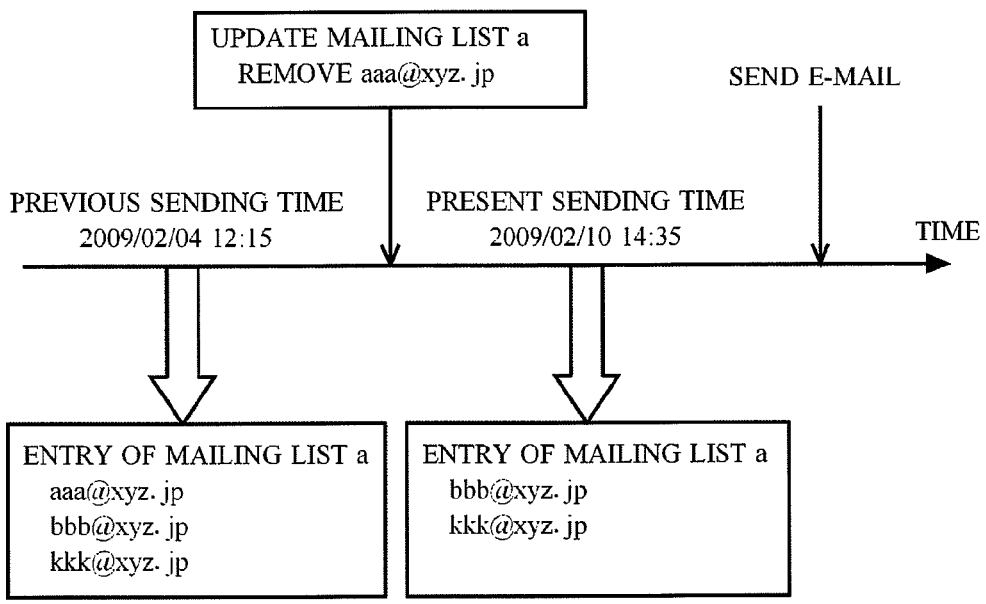
FIG. 9 is another diagram to explain the case that the difference exits.
Figure 10:
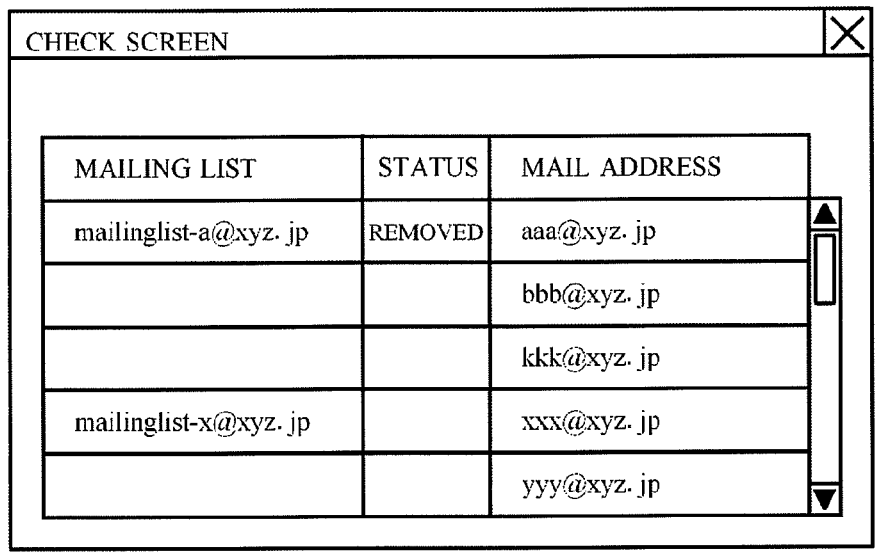
FIG. 10 is an example of a check screen displayed on a sending terminal.

FIG. 9 is another diagram to explain the case that the difference exists, and FIG. 10 is an example of the check screen displayed on the sending terminal 10. For example, E-mail was sent to the mailing list "mailinglist-a@xyz.jp" at the previous sending time "2009/02/04 12:15", and the mail address "aaa@xyz.jp" is removed from the mailing list "mailinglist-a@xyz.jp" by the administrator before E-mail is sent to the mailing list "mailinglist-a@xyz.jp" at the present sending time "2009/02/10 14:35" again. In this case, the difference exists in the mail address of the mailing list "mailinglist-a@xyz.jp" between the present sending time and the previous sending time.

Therefore, when the difference does not exist in "mailinglist-x@xyz.jp", the sending terminal 10 displays each mailing list "mailinglist-a@xyz.jp" and "mailinglist-x@xyz.jp" as illustrated in FIG. 10. In addition, the sending terminal 10 displays: the mail addresses "aaa@xyz.jp", "bbb@xyz.jp", and "kkk@xyz.jp" of the mailing list "mailinglist-a@xyz.jp"; and the mail addresses "xxx@xyz.jp" and "yyy@xyz.jp" of the mailing list "mailinglist-a@xyz.jp". Because the difference exists, "REMOVED" is displayed as the reason of the difference in the "STATUS" field of the mail address "aaa@xyz.jp" corresponding to the difference on the check screen illustrated in FIG. 10.

As described above, "ADDED" and "REMOVED" are displayed in the "STATUS" field on the check screen, so that the visibility of the mail address corresponding to difference is improved. Particularly, as illustrated in FIG. 8 and FIG. 9, it is preferable that the mail address corresponding to the difference is displayed higher prior to other mail addresses of the mailing list. Accordingly, the mail address corresponding to the difference becomes visible.

Referring back to FIG. 4, when the permission to send "YES" is selected on the send confirmation screen (see FIG. 17) displayed together with each determination result (step S105: YES), the sending terminal 10 sends the sending instruction to the sending and receiving server 40 (step S106). This sending instruction becomes the second sending instruction given to the sending and receiving server 40. As described later, when the sending and receiving server 40 receives the sending instruction (the second sending instruction), the E-mail stored in the sending and receiving server 40 is sent to the network.

A behavior of the mailing list maintenance server 30 will be described with reference to FIG. 11A to FIG. 13.

Figure 13:
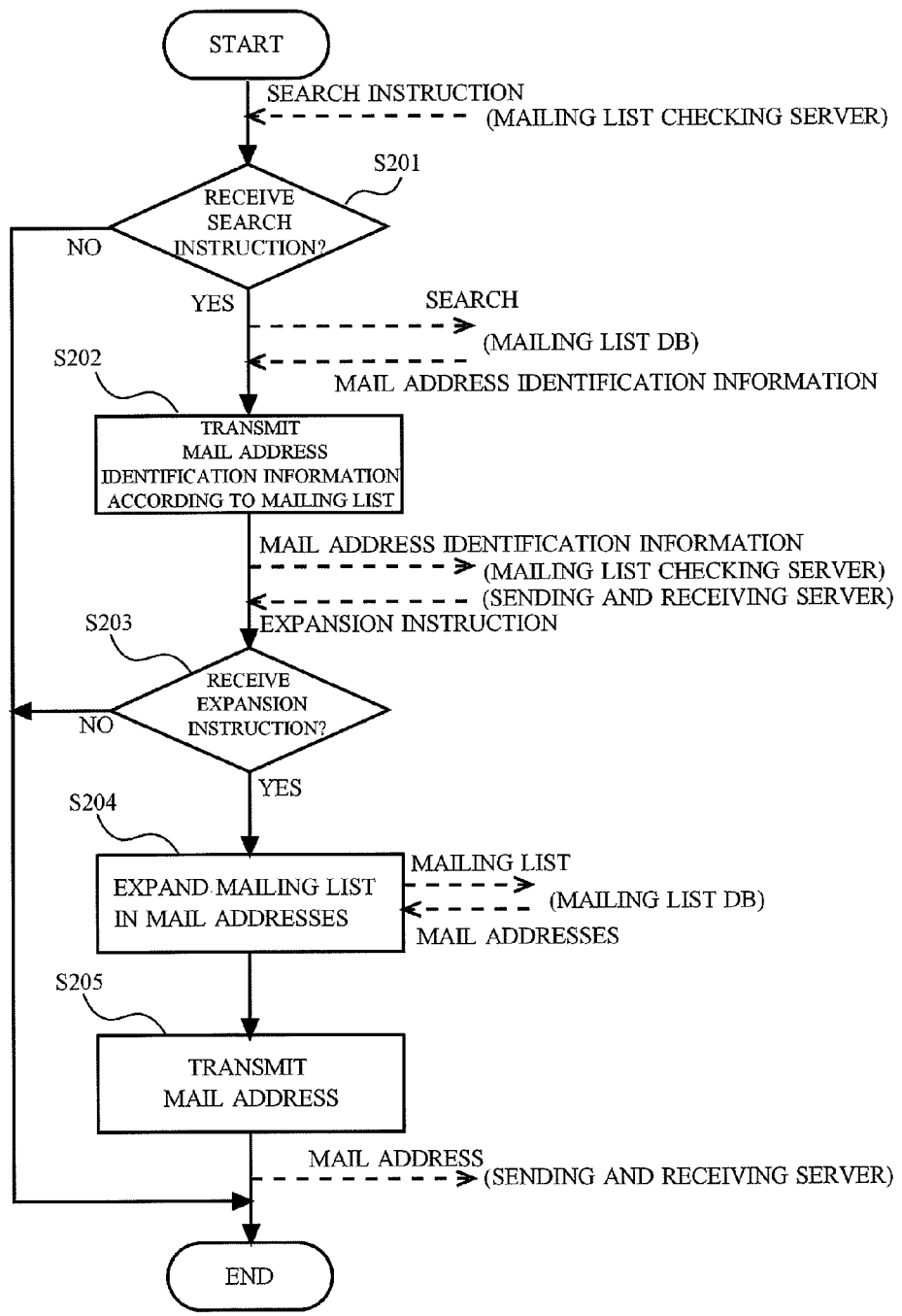
FIG. 13 is a flowchart illustrating a behavior of a mailing list maintenance server.

FIGS. 11A thorough 11C are examples of a mailing list table, FIG. 12 is an example of a mail address table, and FIG. 13 is a flowchart illustrating an example of the behavior of the mailing list maintenance server 30.

The mailing list table and the mail address table are stored in the mailing list DB 32. As illustrated in FIGS. 11A thorough 11C, the mailing list has a data structure including: identification information to identify the mailing list; a mailing list; and multiple mail address identification information of the mailing list.

As illustrated in FIG. 12, the mail address table has a data structure including: mail address identification information to identify a mail address; a name of a user who uses the mail address; the mail address assigned to the user; and the face image of the user. The administrator can acquire the face image from each user preliminarily, relate it to the mail address of the user, and register it.

The mailing list table and the mail address table are related to each other on the basis of the mail address identification information. For example, in the mailing list table, when the mailing list "mailinglist-a@xyz.jp" is specified, the mail address identification information of this mailing list "mailinglist-a@xyz.jp", "001" and "002", are extracted. Then, the mail address table is searched through on the basis of these mail address identification information "001" and "002". As a result, the mail addresses "aaa@xyz.jp" and "bbb@xyz.jp", and face images related to these mail addresses are extracted.

As illustrated in FIG. 13, the ID/address maintenance unit 31 of the mailing list maintenance server 30 determines whether it receives the search instruction (step S201). The search instruction is transmitted from the mailing list check server 20. More specifically, it is transmitted from the difference determination unit 21. The search instruction includes the mailing list. This mailing list is the one specified in the "To" box when E-mail is sent from the sending terminal 10.

When the ID/address maintenance unit 31 determines that it receives the search instruction (step S201: YES), it transmits the mail address identification information according to the mailing list (step S202). More specifically, the ID/address maintenance unit 31 acquires all of the mail address identification information according to the mailing list from the mailing list DB 32. For example, when the mailing list "mailinglist-a@xyz.jp" is included in the search instruction, the mail address identification information "001" and "002" are acquired as illustrated in FIG. 11A. As illustrated in FIG. 11B, when the mail address identification information "011" is added, it is also acquired. As illustrated in FIG. 11C, when the mail address identification information "001" is removed, the mail address identification information "001" is not acquired. The destination of the mail address identification information will be the mailing list check server 20.

Here, the ID/address maintenance unit 31 determines whether it receives the expansion instruction (step S203). The expansion instruction is transmitted from the sending and receiving server 40. The expansion instruction includes the mailing list. This mailing list is the one specified in the "To" box when E-mail is sent from the sending terminal 10.

When the ID/address maintenance unit 31 determines that it receives the expansion instruction (step S203: YES), it expands the mailing list in the mail addresses (step S204). More specifically, the ID/address maintenance unit 31 searches through the mailing list table of the mailing list DB 32 on the basis of the mailing list included in the expansion instruction, and acquires the mail address identification information according to the mailing list. Then, the ID/address maintenance unit 31 searches thorough the mail address table of the mailing list DB 32 on the basis of the acquired mail address identification information, and acquires the mail address according to the mail address identification information. Then, the ID/address maintenance unit 31 transmits the acquired mail address (step S205). The destination of the mail address will be the sending and receiving server 40.

A behavior of the sending and receiving server 40 will be described with reference to FIG. 14.

Figure 14:
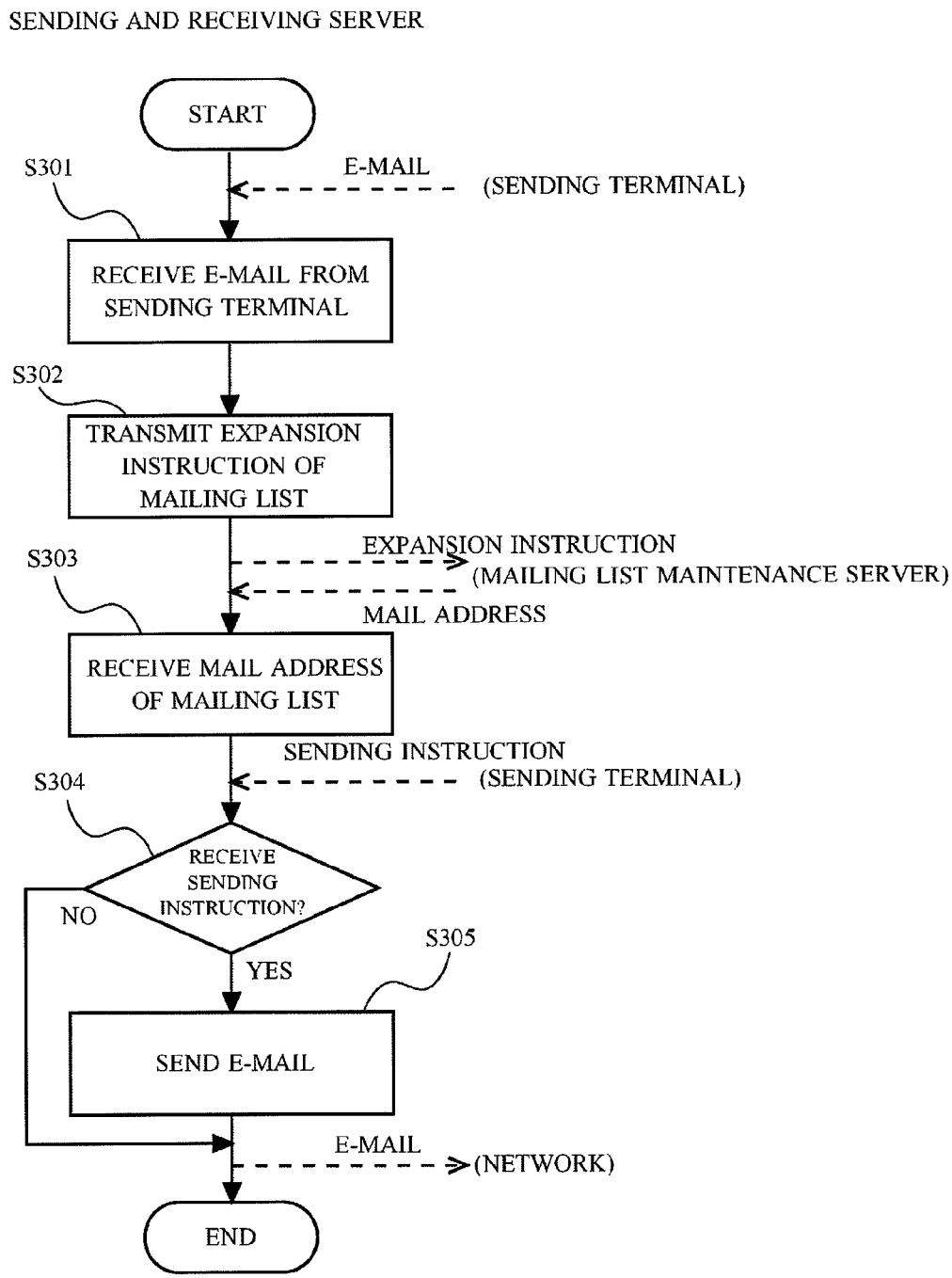
FIG. 14 is a flowchart illustrating a behavior of a sending and receiving server.

FIG. 14 is a flowchart illustrating a behavior of the sending and receiving server 40.

As illustrated in FIG. 14, the sending and receiving server 40 receives E-mail from the sending terminal 10 (step S301). Then, the sending and receiving server 40 transmits the expansion instruction of the mailing list (step S302). The destination of the expansion instruction is the mailing list maintenance server 30 as described above.

Then, the sending and receiving server 40 receives the mail address of the mailing list (step S303). The source of the mail address is the mailing list maintenance server 30 as described above. Accordingly, the destination of E-mail is set.

Here, the sending and receiving server 40 determines whether it receives the sending instruction (step S304). The sending instruction is the instruction transmitted from the sending terminal 10, and corresponds to the second sending instruction. Therefore, the sending and receiving server 40 does not send E-mail till it receives the sending instruction. Accordingly, the E-mail is stored in the sending and receiving server 40.

When the sending and receiving server 40 determines that it receives the sending instruction (step S304: YES), it sends the E-mail (step S305). As a result, the sending and receiving server 40 sends the E-mail to the mail address of the mailing list.

A behavior of the mailing list check server 20 will be described with reference to FIG. 15 to FIG. 17.

Figure 15:
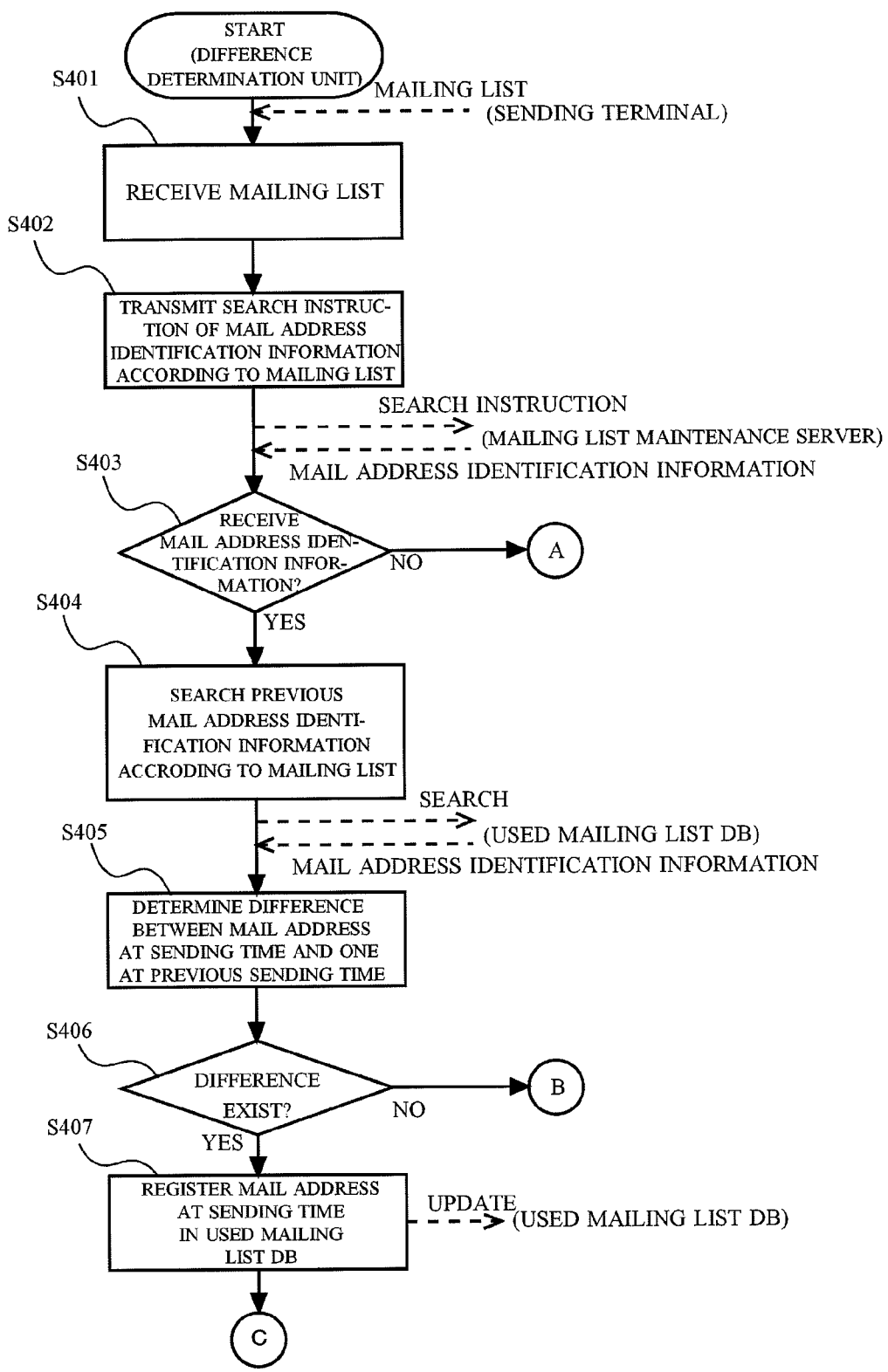
FIG. 15 is a flowchart illustrating a behavior of a difference determination unit.
Figure 16:
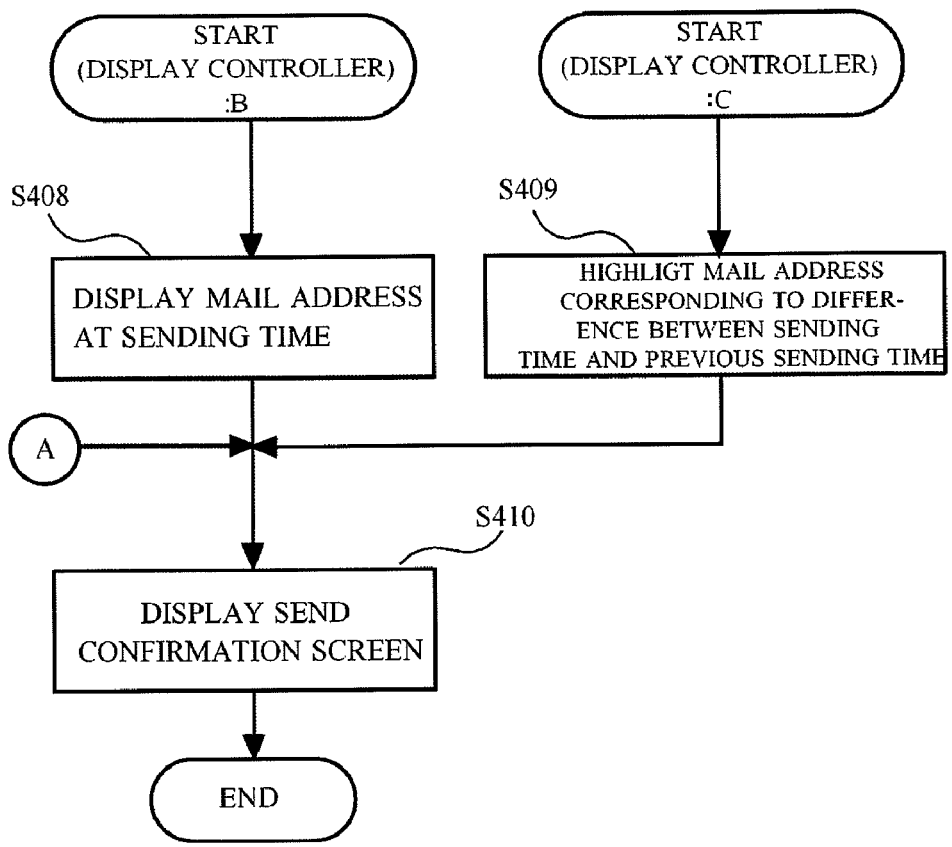
FIG. 16 is a flowchart illustrating a behavior of a display controller.
Figure 17:
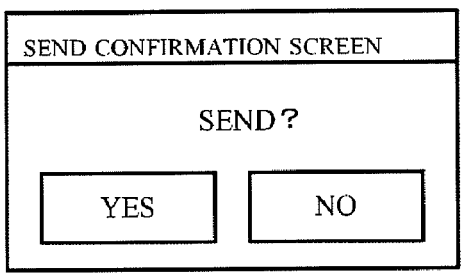
FIG. 17 is an example of a send confirmation screen.

FIG. 15 is a flowchart illustrating a behavior of the difference determination unit 21, FIG. 16 is a flowchart illustrating a behavior of the display controller 22, and FIG. 17 is an example of the send confirmation screen.

As illustrated in FIG. 15, the difference determination unit 21 receives the mailing list (step S401). The source of the mailing list will be the sending terminal 10. Then, the difference determination unit 21 transmits the search instruction of the mail address identification information according to the received mailing list (step S402). The search instruction includes the mailing list. The destination of the search instruction will be the mailing list maintenance server 30. Accordingly, the search process of the mail address identification information on the basis of the mailing list will be executed in the mailing list maintenance server 30.

Here, the difference determination unit 21 determines whether it receives the mail address identification information (step S403). The source of the mail address identification information will be the mailing list maintenance server 30 as described above.

Here, when the difference determination unit 21 determines that it receives the mail address identification information (step S403: YES), it searches the mail address identification information at the previous sending time according to the mailing list (step S404). The search place will be the used mailing list DB 23. The used mailing list DB 23 stores the mailing list used at the previous sending time, and the mail addresses of this mailing list. The storage form is same as the mailing list table described with reference to FIGS. 11A to 11C. The mail address identification information as the search result is transmitted to the difference determination unit 21. Accordingly, the difference determination unit 21 acquires the mail addresses of the mailing list at the previous sending time.

Then, the difference determination unit 21 determines the difference between the mail address at the present sending time (a first mail address) and the mail address at the previous sending time (a second mail address) (steps S405 and S406). The determination process is executed by comparison of the mail address identification information. For example, when the difference determination unit 21 receives the mailing list "mailinglist-a@xyz.jp", and both the mail address identification information at the present sending time and the mail address identification information at the previous sending time are "001" and "002" as illustrated in FIG. 11A, the difference determination unit 21 determines that the difference does not exist (step S406: NO).

Meanwhile, when the mail address identification information at the present sending time are "001", "002", and "011" as illustrated in FIG. 11B and the mail address identification information at the previous sending time are "001", and "002" as illustrated in FIG. 11A, the difference determination unit 21 determines that the difference exists (step S406: YES). In addition, when the mail address identification information at the present sending time are "002" and "011" as illustrated in FIG. 11C, and the mail address identification information at the previous sending time are "001", "002", and "011" as illustrated in FIG. 11B, the difference determination unit 21 determines that the difference exists (step S406: YES).

When the difference determination unit 21 determines that the difference exists in the procedure of the step S406, it updates the used mailing list DB 23 on the basis of the mail address at the present sending time (step S407). For example, if the mail address "kkk@xyz.jp" is added to the mailing list "mailinglist-a@xyz.jp", the mail address identification information "011" corresponding to this mail address "kkk@xyz.jp" is registered. Therefore, if the mailing list table of the used mailing list DB 23 is same as the table illustrated in FIG. 11A, the mailing list table changes from the table illustrated in FIG. 11A to the one illustrated in FIG. 11B.

In addition, if the mail address "aaa@xyz.jp" is removed from the mailing list "mailinglist-a@xyz.jp", the mail address identification information "001" corresponding to this mail address "aaa@xyz.jp" is removed. Therefore, if the mailing list table of the used mailing list DB 23 is same as the table illustrated in FIG. 11B, the mailing list table changes from the table illustrated in FIG. 11B to the table illustrated in FIG. 11C.

Referring to FIG. 16, when the difference determination unit 21 determines that the difference does not exist (step S406: NO), or the procedure of the step S407 is completed, the display controller 22 operates. Here, when the difference determination unit 21 determines that the difference does not exist, the display controller 22 displays the mail address at the present sending time (step S408). The place to display will be the sending terminal 10. The display controller 22 can acquire the mail address from the mail address table of the mailing list DB 32 on the basis of the mail address identification information acquired by the difference determination unit 21. As a result, the sending terminal 10 displays the check screen as illustrated in FIG. 6.

Meanwhile, when the procedure of the step S407 is completed by the difference determination unit 21, the display controller 22 highlights the mail address corresponding to the difference between the previous sending time and the present sending time (step S409). As a result, the sending terminal 10 displays the check screen as illustrated in FIG. 8 and FIG. 10.

When the procedures of the steps S408 and S409 are completed, the display controller 22 displays the send confirmation screen (step S410). As a result, the sending terminal 10 displays the send confirmation screen as illustrated in FIG. 17. Then, when "YES" is selected on the send confirmation screen, the sending instruction (the second sending instruction) is transmitted to the sending and receiving server 40.

As just described, when E-mail is sent from the sending terminal 10 with the mailing list being specified in the "To" box, the mail addresses (the first mail addresses) of the mailing list are displayed on the sending terminal 10. If the difference between the mail address of the mailing list at the present sending time (the first mail address) and the mail address used at the previous sending time (the second mail address) exists, "ADDED" and "REMOVED" are displayed in the "STATUS" field on the check screen. Therefore, the mail address corresponding to the difference (the third mail address) is highlighted.

As a result, even though a new mail address that the user does not want as the destination is added to the mailing list, the user can check before sending, and avoid sending E-mail to the mail address to which the user does not want to send E-mail. Briefly, the information leaks will be reduced. In addition, even though a part of mail addresses of the mailing list is removed, the user can check before sending to reduce the situation that E-mail is not sent to the receiver to whom the user intends to send E-mail.

Second Exemplary Embodiment

Hereinafter, the second exemplary embodiment will be described with reference to FIG. 18 through FIG. 20.

Figure 18:
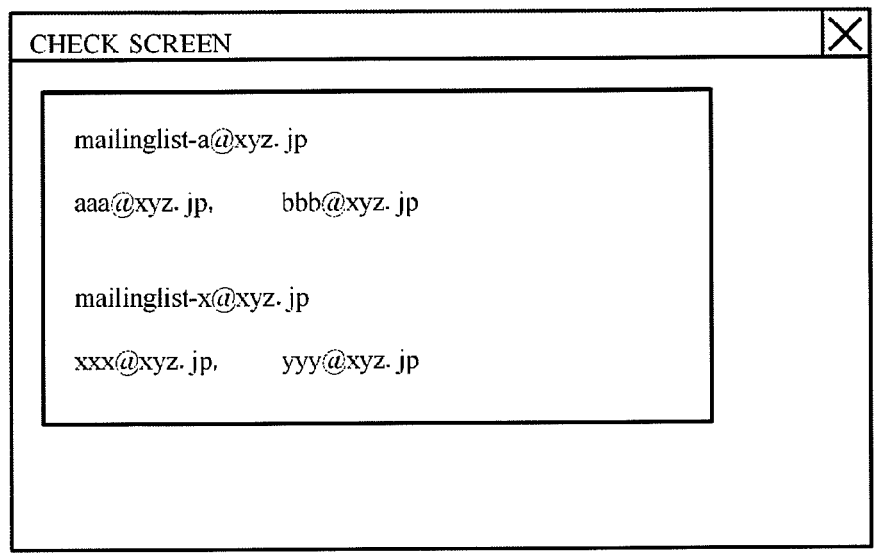
FIG. 18 is an example of a check screen in the case that the difference does not exist in the second exemplary embodiment.
Figure 19:
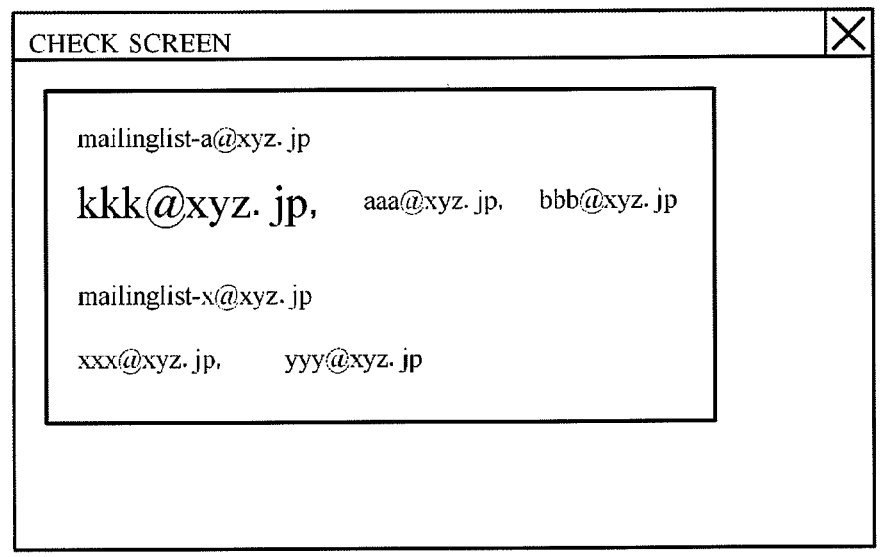
FIG. 19 is an example of a check screen in the case that the difference exists in the second exemplary embodiment.
Figure 20:
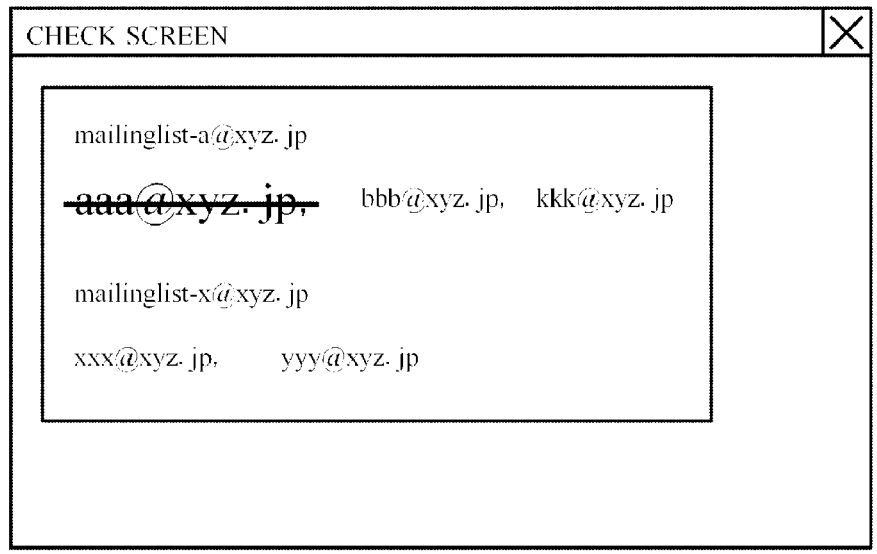
FIG. 20 is an example of a check screen in the case that the difference does not exist in the third exemplary embodiment.

FIG. 18 is an example of the check screen in the case that the difference does not exist in the second exemplary embodiment, FIG. 19 is an example of the check screen in the case that the difference exists in the second exemplary embodiment, and the FIG. 20 is another example of the check screen in the case that the difference exists in the second exemplary embodiment.

In the second exemplary embodiment, the display form of the check screen on the sending terminal 10 is different from the one in the first exemplary embodiment.

When the difference determination unit 21 determines that the difference does not exist, the display controller 22 displays the mailing lists and the mail addresses of the mailing lists with respect to each mailing list. As a result, the sending terminal 10 displays the check screen as illustrated in FIG. 18. On the check screen, the mail addresses is displayed with a unified font size.

Meanwhile, when the difference determination unit 21 determines that the difference exists, the display controller 22 displays the mail address corresponding to the difference with a bigger font size. As a result, the sending terminal 10 displays the check screen as illustrated in FIG. 19. On the check screen, the mail address is displayed with a bigger font size. Briefly, the mail address is highlighted. Therefore, the visibility of the mail address corresponding to the difference is improved.

In addition, when the difference determination unit 21 determines that the difference related to the removal of the mail address exists, the display controller 22 displays the mail address corresponding to the difference together with the cancel image. As a result, the sending terminal 10 displays the check screen as illustrated in FIG. 20. On the check screen, the mail address corresponding to the difference is displayed together with the cancel image. Briefly, the removed mail address is highlighted.

Here, when the cancel image is displayed together, it is not necessary to use a bigger font size to display the mail address. However, as illustrated in FIG. 20, it is preferable to use a bigger font size to display the mail address even when the cancel image is displayed together. Compared to the case not using a bigger font size to display the mail address, the mail address is further highlighted. The cancel image is not limited to the straight line illustrated in FIG. 20, and can be a wavy line. It is preferable to use the cancel image that enables the removed mail address to be identified because the user can not remember which mail address is removed. For example, the removed mail address can be blinked.

Third Exemplary Embodiment

Hereinafter, the third exemplary embodiment of the present invention will be described with reference to FIG. 21 through FIG. 23.

Figure 21:
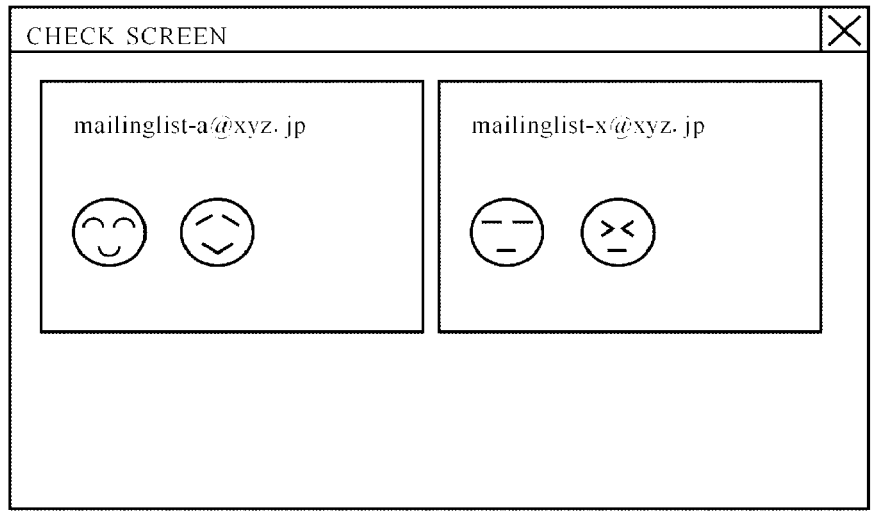
FIG. 21 is an example of a check screen in the case that the difference exists in the third exemplary embodiment.
Figure 22:
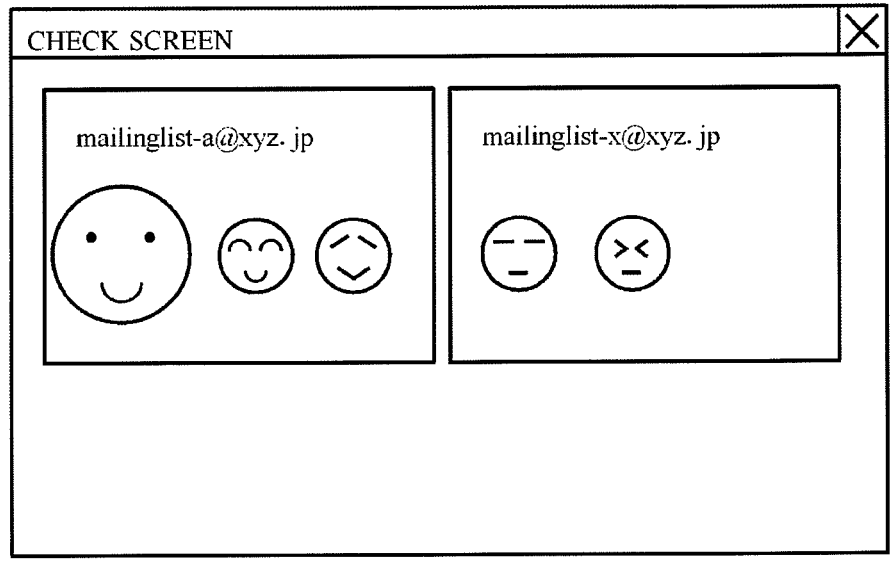
FIG. 22 is an example of a check screen in the case that the difference exists in the third exemplary embodiment.
Figure 23:
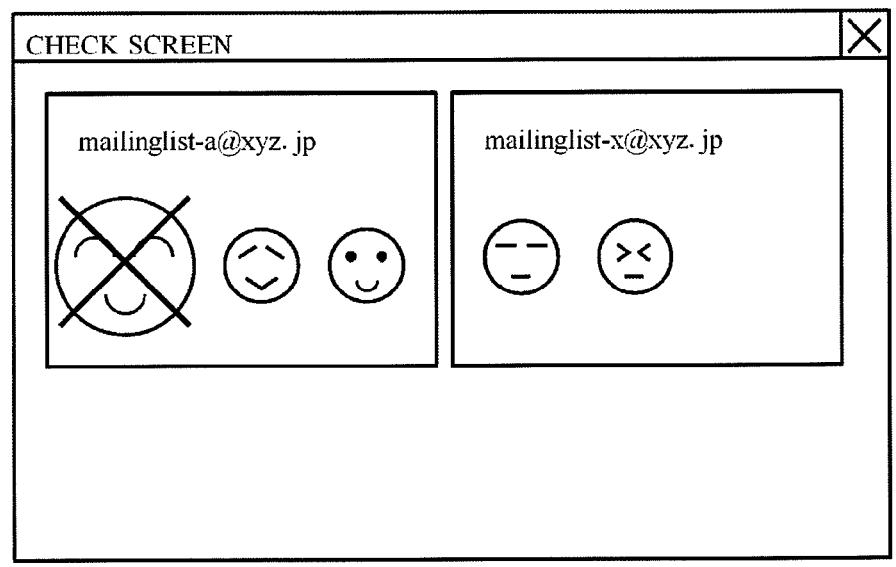
FIG. 23 is another example of a check screen in the case that the difference exists in the third exemplary embodiment.

FIG. 21 is an example of the check screen in the case that the difference does not exist in the third exemplary embodiment, FIG. 22 is an example of the check screen in the case that the difference exists in the third exemplary embodiment, and FIG. 23 is another example of the check screen in the case that the difference exists in the third exemplary embodiment.

In the third exemplary embodiment, the display form of the check screen on the sending terminal 10 is different from the ones in the first exemplary embodiment and the second exemplary embodiment.

When the difference determination unit 21 determines that the difference does not exist, the display controller 22 displays the mailing lists and the face images of the users related to the mail addresses of the mailing list with respect to each mailing list. As a result, the sending terminal 10 displays the check screen as illustrated in FIG. 21. On the check screen, the face images related to the mail addresses are displayed with the unified size.

Meanwhile, when the difference determination unit 21 determines that the difference exists, the display controller 22 displays the face image of the user related to the mail address corresponding to the difference with a bigger size. As a result, the sending terminal 10 displays the check screen as illustrated in FIG. 22. On the check screen, the face image of the added user "K.K" is displayed with a bigger size. Briefly, the face image of the user is highlighted. Therefore, the visibility of the mail address corresponding to the difference is improved.

In addition, when the difference determination unit 21 determines that the difference related to the removal of the mail address exists, the display controller 22 displays the face image of the user related to the mail address corresponding to the difference together with the cancel image. As a result, the sending terminal 10 displays the check screen as illustrated in FIG. 23. On the check screen, the face image of the user "A.A" related to the mail address corresponding to the difference is displayed together with the cancel image. Briefly, the removed mail address is highlighted.

When the cancel image is displayed together, it is not necessary to enlarge the size of the face image. However, as illustrated in FIG. 23, even when the cancel image is displayed together, it is preferable to enlarge the size of the face image. Compared to the case not enlarging the size of the face image, the face image is further highlighted. The cancel image is not limited to the cross illustrated in FIG. 23, and can be a double line. It is preferable to use the cancel image that enables the face image of the user related to the removed mail address to be identified. For example, the face image can be blinked. The face image can be the face image shot by the so-called digital camera, and the face image drawn as an illustration.

Fourth Exemplary Embodiment

Hereinafter, the fourth exemplary embodiment of the present invention will be described with reference to FIG. 24 and FIG. 25.

Figure 25:
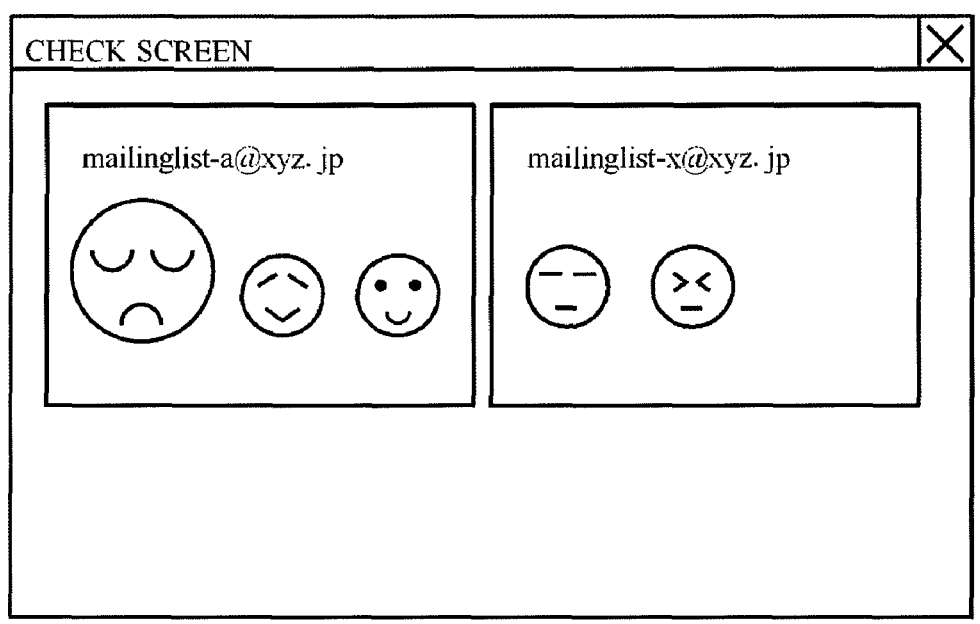
FIG. 25 is an example of a check screen in the case that the difference exists in the fourth exemplary embodiment.

FIG. 24 is an example of the mail address table, FIG. 25 is an example of the check screen in the case that the difference exists in the fourth exemplary embodiment.

As illustrated in FIG. 24, the fourth exemplary embodiment is different from the first to third exemplary embodiments described above at the point that two kinds of face images of which expressions are different with each other are related to the mail address of each user.

Among the face images illustrated in FIG. 24, the face image registered in a "face image (ADDED)" field becomes the face image that is used when the mail address is added to the mailing list. This face image related to "ADDED" is preferably the face image that expresses the joy of being added to the mailing list such as the face image related to the mail address "aaa@xyz.jp".

Among the face images illustrated in FIG. 24, the face image registered in a "face image (REMOVED)" field becomes the face image that is used when the mail address is removed from the mailing list. This face image related to "REMOVED" is preferably the face image that expresses the sadness of being removed from the mailing list such as the face image related to the mail address "aaa@xyz.jp". In addition, it can be the face image that expresses the anger of being removed from the mailing list such as the face image related to the mail address "bbb@xyz.jp".

To determine which face image should be used, the determination result from the difference determination unit 21 of the mailing list check server 20 can be used. The difference determination unit 21 transmits the determination result to the display controller 22. The display controller 22 acquires the face image from the "face image (ADDED)" field if the determination result is related to "ADDED". If the determination result is related to "REMOVED", the display controller 22 acquires the face image from the "face image (REMOVED)" field. The determination result can be "ADDED" when the determination result is not related to "REMOVED".

As described above, when the mail address of the mailing list is added or removed, the user checks the destination with the expression of the face image on the sending terminal 10 as illustrated in FIG. 25. When the face image expresses the sadness, the user understands that the mail address related to that face image was removed. This reduces missending by the user. In this exemplary embodiment, it is also possible to enlarge the size of the face image, or to display the cancel image together.

Although two kinds of face images of which the expressions are different with each other are used in the fourth exemplary embodiment, the display controller 22 can generate two kinds of face images from one face image by executing special image processing. As the special image processing, there is an image processing that changes part of eyes in the face image, or changes part of a mouth, for example. An art to change the face expressions can be used. The two kinds of face images of which the expressions are different with each other can be acquired as just described.

Although a few specific exemplary embodiments employed in the present invention have been shown and described, it should be noted that the present invention is not limited to those exemplary embodiments, and various modifications may be made to them without departing from the scope of the invention defined in the claims and their equivalents. For example, each component in the mailing list check server 20 can be included in the sending terminal 10.

In addition, for example, the program of the present invention can be supplied by the communication unit or by providing a storage medium such as CD-ROM to which the program is stored. Furthermore, the each unit in the block diagram described above can be implemented in the hardware such as a logic circuit. It is also possible to combine all or some of the first to fourth exemplary embodiments.

What is claimed is:

1. An electronic mail sending system comprising:
   a sending terminal that sends an electronic mail;
   a maintenance unit that maintains mailing lists of mail addresses;
   a difference determination unit comprising:
      a determination unit that determines whether a difference exists between mail addresses of a mailing list that is specified as an address of the electronic mail at a time of sending the electronic mail, and mail addresses of a same list as the mailing list that is maintained by the maintenance unit and that was sent at a previous time; and
      a display controller that displays the mail addresses of the mailing list and mail addresses of the same list, along with a determination result from the determination unit on the sending terminal; and
      a sending controller that, if the determination result determines that a difference exists, controls the display controller to display a request for authorization to send the electronic mail, and controls sending of the electronic mail on the basis of a response to the request.

2. An electronic mail sending system comprising:
   a sending terminal that sends an electronic mail;
   a maintenance unit to maintain a mail address of a mailing list;
   a difference determination unit comprising:
   a determination unit that determines whether a difference exists between a first mail address provided from the maintenance unit on the basis of a mailing list and a second mail address of a same mailing list as the mailing list used at previous sending time, when the electronic mail is sent from the sending terminal with the mailing list being specified as an address of the electronic mail; and
   a display controller that displays a determination result from the determination unit on the sending terminal; and
   a sending controller that controls sending of the electronic mail on the basis of an instruction given based on the determination result displayed on the sending terminal, wherein the display controller displays a third mail address corresponding to the difference or a face image of a user related to a third mail address corresponding to the difference with improved visibility when the determination unit determines that the difference exists.

3. The electronic mail sending system according to claim 2, wherein the display controller highlights the third mail address corresponding to the difference or the face image of the user related to the third mail corresponding to the difference when the determination unit determines that the difference exists.

4. The electronic mail sending system according to claim 3, wherein the display controller enlarges the third mail address corresponding to the difference or the face image of the user related to the third mail address corresponding to the difference when the determination unit determines that the difference exists.

5. The electronic mail sending system according to claim 2, wherein the display controller displays the third mail address corresponding to the difference or a face image of a user related to the third mail address corresponding to the difference together with a cancel image when the determination unit determines that the difference related to a removal of the third mail address exists.

6. The electronic mail sending system according to claim 2, wherein the display controller displays the face image of the user related to the third mail address corresponding to the difference after executing a special image processing to the face image of the user when the determination unit determines that the difference exists.

7. The electronic mail sending system according to claim 2, wherein the display controller displays a reason of the difference to the third mail address corresponding to the difference when the determination unit determines that the difference exists.

8. An electronic mail sending method comprising:
   determining whether a difference exists between mail addresses of a mailing list that is specified as an address of an electronic mail at a time of sending the electronic mail, and mail addresses of a same list as the mailing list that was sent at a previous time;
   displaying the mail addresses of the mailing list and the mail addresses of the same list, along with a determination result;
   if the determination result indicates that a difference exists, displaying a request for authorization to send the electronic mail, and
   sending the electronic mail on the basis of a response to the request.

9. A computer readable non-transitory storage medium causing a computer to execute a process, the process comprising:
   determining whether a difference exists between mail addresses of a mailing list that is specified as an address of an electronic mail at a time of sending the electronic mail, and mail addresses of a same list as the mailing list that was sent at a previous time s;
   displaying the mail addresses of the mailing list and the mail addresses of the same list, along with a determination result; and
   if the determination result indicates that a difference exists, displaying a request for authorization to send the electronic mail, and
   sending the electronic mail on the basis of a response to the request.

* * * * *